Figure 1:
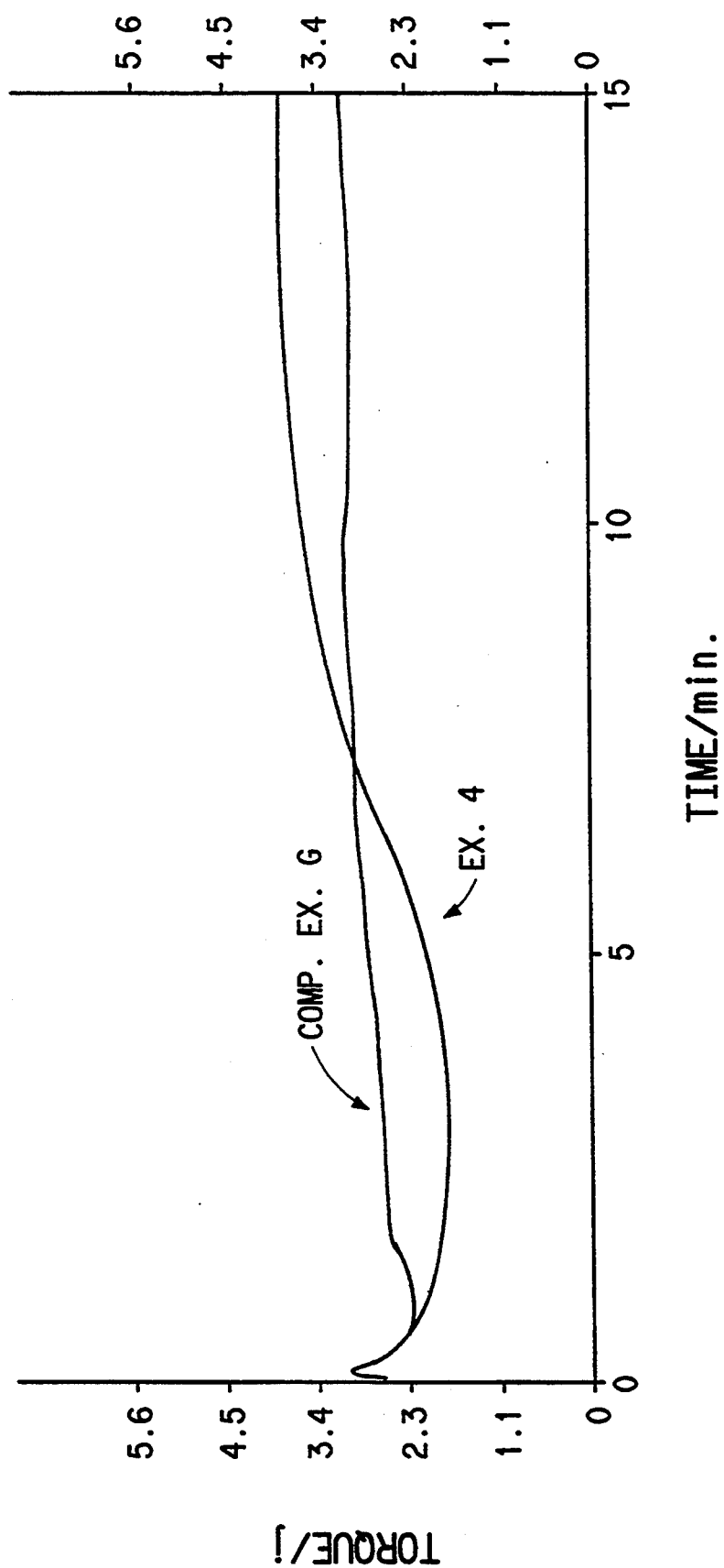

United States Patent

Logothetis

[11] Patent Number: 5,447,993
[45] Date of Patent: Sep. 5, 1995

[54] PERFLUOROELASTOMER CURING

[75] Inventor: Anestis L. Logothetis, Wilmington, Del.

[73] Assignee: E. I. Du Pont de Nemours and Company, Wilmington, Del.

[21] Appl. No.: 230,026

[22] Filed: Apr. 19, 1994

[51] Int. Cl.$^6$ ................................ C08F 8/00
[52] U.S. Cl. .................. 525/273; 525/248; 525/276; 525/326.3; 525/370
[58] Field of Search .............. 525/248, 273, 276, 370

[56] References Cited

U.S. PATENT DOCUMENTS

| | | | |
|---|---|---|---|
| 4,281,092 | 7/1981 | Breazeale | 526/247 |
| 4,394,489 | 7/1983 | Aufdermarsh | 525/370 |
| 4,413,094 | 11/1983 | Aufdermarsh, Jr. | 525/187 |
| 4,525,539 | 6/1985 | Feiring | 525/326.3 |
| 4,713,418 | 12/1987 | Logothetis | 525/200 |
| 4,912,166 | 3/1990 | Stewart | 525/151 |
| 4,983,680 | 1/1991 | Ojakaar | 525/281 |
| 5,268,405 | 12/1993 | Ojakaar | 526/247 |

*Primary Examiner*—Bernard Lipman

[57] ABSTRACT

Nitrile containing perfluoroelastomers are cured by a combination of a peroxide, a coagent, and a catalyst which causes crosslinks to form using the nitrile groups. The method is relatively fast and economical, and gives vulcanizates which have excellent high temperature properties. Triphenyltin hydroxide is an exceptionally good catalyst for the formation of crosslinks from nitrile groups in perfluoroelastomers.

15 Claims, 1 Drawing Sheet

PERFLUOROELASTOMER CURING

FIELD OF THE INVENTION

Disclosed herein s a composition and method for the curing (crosslinking) of a perfluoroelastomer containing nitrile groups using a dual cure system of a peroxide catalyzed cure and a catalyst that crosslinks using the nitrile groups. The cure requires only a short time in a mold, and produces a vulcanizate that has thermally stable crosslinks.

TECHNICAL BACKGROUND

Perfluoroelastomers are materials often possessing very good resistance to high temperatures and/or chemical attack. This makes them valuable for uses such as O-rings and gaskets where high temperatures and/or chemicals are present, and good sealing properties are needed. One drawback to the use of these materials is their cost, which is often contributed to by the high cost of molding and curing (crosslinking) perfluoroelastomer parts. Thus, methods for less expensive cures for these polymers which produce thermally and chemically stable crosslinked networks are desirable.

U.S. Pat. Nos. 4,281,092 and 4,394,489 and commonly assigned U.S. patent application Ser. No. 08/197,516, filed Feb. 16, 1994, describe the preparation and/or curing of nitrile containing perfluoroelastomers. The curing is done in the presence of an organotin catalyst. No mention is made of using a peroxide cure with these polymers.

U.S. Pat. No. 4,983,680 describes the peroxide catalyzed curing (optionally with coagents) of a nitrile containing perfluoroelastomer. No mention is made of combining this cure with another cure.

SUMMARY OF THE INVENTION

This invention concerns a process for the curing of a perfluoroelastomer comprising:
(a) confining to a specific shape a mixture comprising:
   (i) a perfluoroelastomer containing a plurality of nitrile groups;
   (ii) a tin catalyst capable of catalyzing the crosslinking of said perfluoroelastomer through said nitrile groups; and
   (iii) a peroxide capable of crosslinking said perfluoroelastomer and a coagent which is a diene or triene; while heating said mixture at a first temperature sufficient to decompose said peroxide;
(b) removing said mixture from confinement; and
(c) heating said mixture at a second temperature, which is higher than said first temperature, for a period of time sufficient to form crosslinks from said nitrile groups.

This invention also concerns a composition comprising:
a perfluoroelastomer containing a plurality of nitrile groups;
about 0.1 to about 10 parts by weight per hundred parts of said perfluoroelastomer of a tin catalyst capable of catalyzing the crosslinking of said perfluoroelastomer through said nitrile groups;
about 0.1 to about 10 parts by weight per hundred parts of said perfluoroelastomer of a peroxide capable of curing said perfluoroelastomer; and
about 0.1 to about 10 parts by weight per hundred parts of said perfluoroelastomer of a coagent which is a diene or triene.

Also described herein is a process for the catalyzed crosslinking of a perfluoroelastomer containing a plurality of nitrile groups by heating said perfluoroelastomer in the presence of a catalyst capable of curing said perfluoroelastomer through said nitrile groups, wherein the improvement is the use of triphenyltin hydroxide as said catalyst.

DETAILS OF THE INVENTION

The invention herein may be described as a dual cure system for a nitrile containing perfluoroelastomer. By a dual cure system is meant that it is believed that two (chemically) distinct types of cures take place, one caused by a peroxide and a coagent, and the other caused by a catalyzed reaction of nitrile groups.

The polymer used herein (in the curing process and in the composition to be cured) is a perfluoroelastomer containing a plurality of nitrile groups. By this is meant a perfluoroelastomer which contains a sufficient amount of nitrile groups which act as cure sites to crosslink the perfluoroelastomer. Usually, the nitrile groups are introduced by use of a nitrile containing cure site monomer, i.e., the nitrile groups are introduced into the polymer during polymerization. Suitable polymers are described in U.S. Pat. No. 4,281,092, which is hereby included by reference. It is preferred if the perfluoroelastomer contains 0.1 to 2.5 mole percent of the nitrile containing cure site monomer.

Preferred perfluoroelastomers herein are copolymers of tetrafluoroethylene, a perfluoro(alkyl vinyl ether) and a nitrile containing cure site monomer. A preferred alkyl vinyl ether is perfluoro(methyl vinyl ether). An especially preferred perfluoroelastomer contains 53–79.9 mole percent tetrafluoroethylene, 20–46.9 mole percent perfluoro(methyl vinyl ether) and 0.1 to 2.5 mole percent nitrile containing cure site monomer. A preferred cure site monomer is a perfluorinated polyether having a nitrile group and a trifluorovinyl ether group. A more preferred cure site monomer is

$$CF_2=CF[OCF_2CF(CH_3)]_nOCF_2CF_2CN$$

wherein n is 1, 2, 3 or 4. An especially preferred cure site monomer is perfluoro (8-cyano-5-methyl-3,6-dioxa-1-octene).

The perfluoroelastomer is preferably made in emulsion systems using free radical initiation (see U.S. Pat. No. 4,281,092, which is hereby included by reference). Chain transfer agents such as perfluoriiodides, methylene iodide, and hydrocarbons can be used to control molecular weight to give lower viscosity polymers with better processing properties.

One of the cures of the dual cure employed herein uses a (organic) peroxide in combination with a coagent which is a diene or triene. For practical reasons in handling elastomeric materials, peroxides which decompose at 100° C. or more, and which give relatively high energy free radicals are most suitable. Suitable peroxides are given in U.S. Pat. No. 4,035,565, col. 5, lines 30 to 50, which patent is hereby included by reference. Useful peroxides include alpha, alpha'-bis-(t-butylperoxy)diisopropylbenzene and 2,5-bis(t-butylperoxy)-2,5-dimethylhexane. The peroxides may be used neat, but more commonly are used in some dilute form, such as on an inert carrier. Herein the amount of peroxide present is calculated based on pure peroxide. The peroxide is normally present in an amount in which it can effectively cure (crosslink) the perfluoroelastomer, typically about 0.1 to about 10 parts per hundred of perfluoroelastomer (all such parts herein are by weight). It is preferred if the amount of peroxide used is about 0.3 to about 5 parts per hundred of the perfluoroelastomer.

A coagent is used in the peroxide cure. This coagent is a diene or a triene. Preferred coagents are triallylisocyanurate and triallylcyanurate. Other useful coagents are found in U.S. Pat. No. 4,035,565, col. 6, lines 20–35, which is incorporated herein by reference. The coagent is normally present in an amount in which it can effectively cure (crosslink) the perfluoroelastomer, typically about 0.1 to about 10 part per hundred of perfluoroelastomer (all such parts herein are by weight). It is preferred if the amount of coagent used is about 0.3 to about 5 parts per hundred of the perfluoroelastomer.

In the peroxide portion of the dual cure the mixture containing the perfluoroelastomer is confined in a specific shape. What is meant by confined herein is that the mixture is held under a pressure sufficient to prevent the mixture from forming bubbles and voids, or distorting from the desired final part shape, presumably while the peroxide is forming crosslinks. This confinement will typically be in a mold, such as a compression or transfer mold.

The peroxide part of the cure is done at a first temperature, which is a temperature sufficiently high to cause thermal decomposition of the peroxide at a reasonable rate. The confined mixture is held at that first temperature for an amount of time sufficient to form enough crosslinks so that the part shape will be maintained, and no voids will form, when heated to the second temperature. This first temperature is typically about 150° C. to about 220° C. Typical periods for this heating step are about 2 to about 60 minutes. Generally the shortest time at which sufficient crosslinking can be obtained will be used, since this maximizes productivity of the equipment used, such as the molds and presses.

After this peroxide cured portion of the dual cure is done, the perfluoroelaster may be removed from confinement. The other part of the dual cure system is believed to involve the nitrile groups present in the perfluoroelastomer, and the catalyst which is present in the mixture. Typically, the catalyst used is an organotin compound, see U.S. Pat. No. 4,281,092 and U.S. patent application 08/197,516, filed Feb. 16, 1994, both of which are hereby included by reference. Preferred catalysts are tetraphenyltin, and triphenyltin hydroxide. Triphenyltin hydroxide is especially preferred (in a dual cure or in a cure only involving the nitrile groups) since it cures nitrile containing perfluoroelastomers faster (see Example 4 and Comparative Example G).

This part of the dual cure is done at a second temperature which is high enough, and for an amount of time which is long enough, to effect cure (crosslinking) through the nitrile groups. Typically this will be a temperature of about 250° C. to about 310° C., and a typical curing time is about 1 hr. to about 48 hr., preferably about 3 hr. to about 24 hr.

When the perfluoroelastomer is at the second temperature, or is being heated to the second temperature, it may be done in air, but it is preferred if it is done in an atmosphere of an inert gas such as nitrogen or argon.

It is believed that during the second part of the dual cure herein the nitrile groups, in the presence of a catalyst which can catalyze the reaction, trimerize to form s-triazine rings, which are the crosslinks. These crosslinks (whatever they are) are very thermally stable, even at temperatures of 275° C. or above. By contrast, crosslinks formed with peroxides are not as thermally stable, exhibiting instability at about 220° C. Therefore, for parts for high temperature use, "nitrile cures" are preferred.

However, nitrile cures are very slow, meaning that cure times in the mold are very long before the part may be demolded, since sufficient crosslinks must form to hold the part shape and prevent voids from forming. This makes the nitrile cure very expensive in terms of labor and equipment productivity. On the other hand, a peroxide cure is much faster, but as mentioned above, is relatively thermally unstable. The dual cure system surprisingly combines the advantage of the peroxide cure, a relatively fasts and economical cure, with the advantage of the thermally stable crosslinks of the nitrile cure. In the Examples (numbered) and Comparative Examples (lettered) the following abbreviations are used :

8CNVE—perfluoro(8-cyano-5-methyl-3,6-dioxa-1-octene)
PMVE—perfluoro(methyl vinyl ether)
The following test methods are used in the Examples:
Mooney Scorch—ASTM D-1646
Oscillating Disc Rheometer (ODR)—ASTM D-2084
Tensile Properties—ASTM D-1708
Compression Set—ASTM D-1414

Polymers for the Examples and Comparative Examples

The polymers used in Examples 1, 2, and Comparative Examples A and B were made in an emulsion polymerization at 85° C. using ammonium persulfate as the initiator. The polymers contained 43.2% PMVE, 2.2% 8CNVE (the remainder tetrafluoroethylene) ad had an inherent viscosity of 0.51. The polymer for Example 3 was similarly made, except $I(CF_2)_4I$ was used for chain transfer. This polymer contained 45.5% PMVE, 2.3% 8CNVE and 0.05% iodine, and had an inherent viscosity of 0.43. The polymers for Comparative Examples were made in a similar way, except those for C and D were not made with an iodo chain transfer agent.

The compounds were made on a rubber mill and parts were molded on a press. In all these examples triphenyltin hydroxide (TPT-OH) was used as the catalyst, Luperco® (available from ATO Chemie, 50% active ingredient) 101XL [2,5-bis-(t-butylperoxy)-2,5-dimethylhexane] as the peroxide and triallyl isocyanurate (TAIC) as the coagent. In Table 1 is shown examples of stocks with the dual cure system and with just the TPT-OH. Examples 2, 3, and B include the use of a plasticizer, Krytox® 16350 (available from E. I. du Pont de Nemours and Company, Wilmington, Del.).

TABLE 1

| Cured Properties of Perfluoroelastomer-Dual Cure System | | | | | |
|---|---|---|---|---|---|
| | 1 | 2 | A | B | 3 |
| Compound | | | | | |
| Polymer | 100 | 100 | 100 | 100 | 100 |
| MT Black | 30 | 30 | 30 | 30 | 30 |
| TPT-OH | 2 | 2 | 2 | 2 | 2 |
| Luperco ® 101XL | 1 | 1 | — | — | 1 |
| TAIC | 1 | 1 | — | — | 1 |
| Krytox ® 16350 | — | 12 | — | 12 | 10 |
| Properties | | | | | |
| Mooney Scorch 121° C. | 64 | 59 | 55 | 53 | 66 |

TABLE 1-continued

Cured Properties of Perfluoroelastomer-Dual Cure System

| | 1 | 2 | A | B | 3 |
|---|---|---|---|---|---|
| No rise after 30 min. ODR 177° C./3° C. arc | | | | | |
| ML, N.m | — | 1.75 | 1.35 | 1.1 | 0.9 | 1.3 |
| ts2, mins. | 2 | 2.5 | >5 | >5 | 1.2 |
| MH (30 min.), N.m | 5.1 | 3.8 | 3.3 | 2.2 | 4.5 |
| Mh-ML, N.m | 3.35 | 2.45 | 2.2 | 1.4 | 3.2 |
| Tensile Properties (O-Rings) | | | | | |
| M50, MPa | 4.98 | 2.71 | 2.88 | 1.74 | 2.67 |
| M100, MPa | 7.03 | 6.58 | 7.90 | 4.01 | 7.13 |
| Tb, MPa | 12.4 | 12.0 | 13.8 | 8.48 | 11.3 |
| Eb, % | 107 | 155 | 142 | 175 | 133 |
| Comp. Set 204° C./70 h | 15 | 23 | 19 | 26 | 23 |
| O-rings After heat aging at 275° C. for: | | | | | |
| 3 days | 20 | 21 | 18 | 22 | 25 |
| 7 days | 23 | 28 | 18 | 26 | 26 |
| 14 days | 24 | 26 | 20 | 24 | 30 |

The press cures for 1, 2 and 3 samples were at 177° C./15 min.
The press cures for A and B were done at 200° C./30 min.
All samples were post cured at 305° C. for 42 h under an atmosphere of nitrogen.
The O-rings were heat aged in an air oven for the designated time and tested for comp. set at 204° C./70 h.

In another series of Comparative Examples polymers were cured either by a peroxide cure or just by tin catalysis, and there was a distinct difference in the properties between the two systems. The results are shown in Table 2.

TABLE 2

Physical Properties of Perfluoroelastomers Cured by-Peroxides and by Tetraphenyl Tin

| Raw Polymer | | |
|---|---|---|
| PMVE wt % | 43.70 | 43.00 |
| 8CNVE wt % | 2.2 | 2.1 |
| Inh. Visc. | 0.60 | 0.46 |
| Mooney at 121° C. | 134 | 52 |
| Iodine wt % | 0 | 0.14 |

| | Example | | | |
|---|---|---|---|---|
| | C TPT Cure | D Peroxide | E TPT Cure | F Peroxide |
| Compound | | | | |
| Polymer | 100 | 100 | 100 | 100 |
| MT Black | 15 | 15 | 15 | 15 |
| TPT | 2 | — | 2 | — |
| Luperco ® 101XL | — | 5 | — | 5 |
| TAIC | — | 3 | — | 3 |
| ODR | | | | |
| ML, N.m | 2.1 | 2.1 | 1.0 | 1.4 |
| | (190° C.) | (177° C.) | (190° C.) | (177° C.) |
| Ts2, min. | >5 | 2.5 | >5 | 2.0 |
| MH (15 min.), N.m | 2.7 | 4.6 | 1.5 | 4.8 |
| MH-ML, N.m | 0.6 | 2.5 | 0.5 | 3.4 |
| Tensile Properties | | | | |
| M100, MPa | 4.13 | 7.23 | 3.45 | 10.7 |
| Tb, MPa | 14.1 | 13.8 | 13.1 | 14.5 |
| Eb, % | 160 | 140 | 180 | 120 |
| Comp. Set 204° C./70 h | | | | |
| Pellets | 12 | 25 | 17 | 27 |
| O-rings | 16 | 30 | 28 | 29 |
| After heat aging at 275° C. for: | | | | |
| O-rings | | | | |
| 3 days | 19 | 55 | 28 | 60 |
| 7 days | 21 | 60 | 26 | 57 |
| 14 days | 20 | 60 | 28 | 63 |

The C and E samples were press cured at 200° C./30 min and the D and F at 175° C./15 min.
All samples were post-cured in an oven under nitrogen at 288°.C. for 46 hrs. before testing.
The samples were heat aged in an air oven for the designated time and the comp. sets were measured at 204° C./70 h.

EXAMPLE 4 AND COMPARATIVE EXAMPLE G

In a rubber mill were compounded, 1) a nitrile containing perfluoroelastomer (PMVE 44.0 wt %, 8CNVE 2.2 wt %, inh. visc. 0.55) made in an emulsion system using ammonium persulfate initiation at 85° C., 2) 10 phr MT black and 3) 1 phr triphenyltin hydroxide. From the compounded stock dumbbells and O-rings were molded in a press at 200° C./15 min. These parts were post-cured at 260° C./24 hr under an atmosphere of nitrogen before testing. The results are shown in Table 3 as Example 4.

A control (Comparative Example G), in which 2 parts of tetraphenyltin was used as the curing catalyst instead of triphenyltin hydroxide, was also done. All other conditions were the same as for Example 4. Results are shown in Table 3.

ODR tests were also run (temperature of 177° C.) and the results are shown in FIG. 1. This Figure clearly indicates that the compound in which triphenyltin hydroxide was the catalyst cures (crosslinks) much faster than when tetraphenyltin is used as the catalyst.

TABLE 3

| Example | 4 | G |
|---|---|---|
| Tensiles | | |
| M100, MPa | 5.95 | 5.97 |
| M200, MPa | 14.0 | 14.2 |
| Tb, MPa | 26.9 | 21.5 |
| Eb, % | 313 | 265 |
| Compression Set 204° C./70 h | 21 | 24 |

What is claimed is:

1. A process for the curing of a perfluoroelastomer, comprising,
   (a) confining to a specific shape a mixture, comprising:
   (i) a perfluoroelastomer containing a plurality of nitrile groups;
   (ii) a tin catalyst capable of catalyzing the crosslinking of said perfluoroelastomer through said nitrile groups; and
   (iii) a peroxide capable of crosslinking said perfluoroelastomer and a coagent which is a diene or triene; while heating said mixture at a first temperature sufficient to decompose said peroxide;
   (b) removing said mixture from confinement; and
   (c) heating said mixture at a second temperature, which is higher than said first temperature, for a period of time sufficient to form crosslinks from said nitrile groups.

2. The process as recited in claim 1 wherein said perfluoroelastomer is a copolymer of a perfluoro(alkyl vinyl ether), tetrafluoroethylene, and a nitrile containing cure site monomer.

3. The process as recited in claim 1 wherein said perfluoroelastomer is a copolymer of 53–79.9 mole percent tetrafluoroethylene, 20–46.9 mole percent perfluoro(methyl vinyl ether), and 0.1 to 2.5 mole percent perfluoro(8-cyano-5-methyl-3,6-dioxa-1-octene).

4. The process as recited in claim 1 wherein said first temperature is about 150° C. to about 220° C., said second temperature is about 250° C. to about 320° C.

5. The process as recited in claim 4 wherein about 0.3 to about 5 parts by weight of said peroxide per hundred parts of said perfluoroelastomer are present, about 0.3 to about 5 parts by weight of triallyl isocyanurate or triallyl cyanurate per hundred parts of said perfluoroelastomer are present, and about 0.3 to about 5 parts by weight of said catalyst per hundred parts of said perfluoroelastomer are present, said catalyst being an organotin compound.

6. The process as recited in claim 3 wherein said first temperature is about 150° C. to about 220° C., said second temperature is about 250° C. to about 320° C.

7. The process as recited in claim 6 wherein about 0.3 to about 5 parts by weight of said peroxide per hundred parts of said perfluoroelastomer are present, about 0.3 to about 5 parts by weight of triallyl isocyanurate or triallyl cyanurate per hundred parts of said perfluoroelastomer are present, and about 0.3 to about 5 parts by weight of said catalyst per hundred parts of said perfluoroelastomer are present, said catalyst being an organotin compound.

8. The process as recited in claim 5 wherein said catalyst is tetraphenyltin or triphenyltin hydroxide.

9. The process as recited in claim 7 wherein said catalyst is tetraphenyltin or triphenyltin hydroxide.

10. A composition comprising:
   a perfluoroelastomer containing a plurality of nitrile groups;
   about 0.1 to about 10 parts by weight per hundred parts of said perfluoroelastomer of a tin catalyst capable of catalyzing the crosslinking of said perfluoroelastomer through said nitrile groups;
   about 0.1 to about 10 parts by weight per hundred parts of said perfluoroelastomer of a peroxide capable of curing said perfluoroelastomer; and
   about 0.1 to about 10 parts by weight per hundred parts of said perfluoroelastomer of a coagent which is a diene or triene.

11. The composition as recited in claim 10 wherein said perfluoroelastomer is a copolymer of a perfluoro(alkyl vinyl ether), tetrafluoroethylene, and a nitrile containing cure site monomer.

12. The composition as recited in claim 10 wherein said perfluoroelastomer is a copolymer of 53–79.9 mole percent tetrafluoroethylene, 20–46.9 mole percent perfluoro(methyl vinyl ether), and 0.1 to 2.5 mole percent perfluoro(8-cyano-5-methyl-3,6-dioxa-1-octene).

13. The composition as recited in claim 10 about 0.3 to about 5 parts by weight of said peroxide per 100 parts of perfluoroelastomer are present, wherein about 0.3 to about 5 parts by weight of triallyl isocyanurate or triallyl cyanurate per hundred parts of said perfluoroelastomer are present, and about 0.3 to about 5 parts by weight of said catalyst per hundred parts of said perfluoroelastomer are present, said catalyst being an organotin compound.

14. The composition as recited in claim 12 wherein about 0.3 to about 5 parts by weight of said peroxide per 100 parts of said perfluoroelastomer are present, about 0.3 to about 5 parts by weight of triallyl isocyanurate or triallyl cyanurate per hundred part of said perfluoroelastomer are present and about 0.3 to about 5 parts by weight of said catalyst per hundred parts of said perfluoroelastomer are present, said catalyst being an organotin compound.

15. The composition as recited in claim 14 wherein said catalyst is tetraphenyltin or triphenyltin hydroxide.

* * * * *